US008577546B2

(12) United States Patent  
Günther et al.

(10) Patent No.: US 8,577,546 B2  
(45) Date of Patent: Nov. 5, 2013

(54) METHOD AND DEVICE FOR MONITORING THE DRIVING BEHAVIOR OF A RAILWAY VEHICLE

(75) Inventors: Frank Günther, Munich (DE); Jörg-Johannes Wach, Munich (DE); Ulf Friesen, Neubiberg (DE); Stefan Sedlmair, Grafrath (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 13/496,620

(22) PCT Filed: Sep. 14, 2010

(86) PCT No.: PCT/EP2010/063488
§ 371 (c)(1),
(2), (4) Date: May 4, 2012

(87) PCT Pub. No.: WO2011/032948
PCT Pub. Date: Mar. 24, 2011

(65) Prior Publication Data
US 2012/0209471 A1      Aug. 16, 2012

(30) Foreign Application Priority Data

Sep. 18, 2009   (DE) .......................... 10 2009 041 823

(51) Int. Cl.
*G01M 17/00* (2006.01)
(52) U.S. Cl.
USPC ........................................................ 701/33.6
(58) Field of Classification Search
USPC ........................................................ 701/33.6
See application file for complete search history.

(56) References Cited

U.S. PATENT DOCUMENTS 4,702,104 A * 10/1987 Hallberg .......................... 73/146
5,419,197 A *  5/1995 Ogi et al. ........................ 73/659

(Continued)

FOREIGN PATENT DOCUMENTS

EP    1274979 A1   1/2003
GB    2365528 A    2/2002

(Continued)

OTHER PUBLICATIONS

Notification Concerning Transmittal of International Preliminary Report on Patentability and Written Opinion of the International Search Authority for International Patent Application No. PCT/EP2010/063488, dated Sep. 14, 2010 and the English Translation.

(Continued)

*Primary Examiner* — Mary Cheung
*Assistant Examiner* — Anne Mazzara
(74) *Attorney, Agent, or Firm* — Barnes & Thornburg LLP

(57) ABSTRACT

A method for monitoring the driving behavior of a railway vehicle, wherein at least one measurement variable characterizing the vibrational behavior of at least one wheel set of the railway vehicle, is captured by at least one sensor providing a corresponding measurement signal. The method includes the steps of identifying at least one significant event or a combination of multiple significant events within the time trace of the measurement signal and identifying the event time at which the significant event took place, deriving the frequency from the time trace of the measurement signal starting from the event time, comparing the derived frequency to at least one stored reference frequency, evaluating the vibrational behavior of the wheel set as a function of the deviation of the derived frequency from the at least one stored reference frequency.

18 Claims, 2 Drawing Sheets

(56) References Cited

U.S. PATENT DOCUMENTS

| | | | |
|---|---|---|---|
| 5,433,111 A * | 7/1995 | Hershey et al. | 73/593 |
| 6,101,432 A * | 8/2000 | Her et al. | 701/33.6 |
| 6,377,876 B1 * | 4/2002 | Hedeen et al. | 701/19 |
| 6,481,271 B1 * | 11/2002 | Ward et al. | 73/118.01 |
| 6,539,293 B2 * | 3/2003 | Bachtiger et al. | 701/20 |
| 6,951,132 B2 * | 10/2005 | Davenport et al. | 73/598 |
| 7,184,930 B2 * | 2/2007 | Miyasaka et al. | 702/183 |
| 7,213,789 B1 * | 5/2007 | Matzan | 246/169 S |
| 7,437,274 B2 * | 10/2008 | Charette et al. | 702/184 |
| 7,945,362 B2 * | 5/2011 | Dobkin et al. | 701/37 |
| 8,234,917 B2 * | 8/2012 | Burkhart et al. | 73/117.03 |
| 2003/0033883 A1 * | 2/2003 | Chen | 73/649 |
| 2006/0167659 A1 * | 7/2006 | Miyasaka et al. | 702/185 |
| 2009/0001226 A1 * | 1/2009 | Haygood | 246/169 S |

FOREIGN PATENT DOCUMENTS

| | | |
|---|---|---|
| WO | 0060322 A1 | 10/2000 |
| WO | 0076828 A1 | 12/2000 |

OTHER PUBLICATIONS

Search Report for International Patent Application No. PCT/EP2010/063488; Nov. 15, 2010.

* cited by examiner

METHOD AND DEVICE FOR MONITORING THE DRIVING BEHAVIOR OF A RAILWAY VEHICLE

PRIORITY CLAIM

This patent application is a U.S. National Phase of International Patent Application No. PCT/EP2010/063488, filed 14 Sep. 2010, which claims priority to German Patent Application No. 10 2009 041 823.7, filed 18 Sep. 2009, the disclosures of which are incorporated herein by reference in their entirety.

FIELD

The disclosed embodiments relate to a method and to a device for monitoring the driving behavior of a rail vehicle, in which at least one measurement variable characterizing the oscillation behavior of at least one wheel set of the rail vehicle, such as the fluctuation, the speed or the acceleration of the wheel set, or the force acting on the wheel set, is captured by at least one sensor supplying a corresponding measurement signal.

BACKGROUND

In rail vehicle traffic, increasing use is being made of diagnostic and monitoring systems with which state changes of components and assemblies of the rail vehicle are sensed to detect defects in these components and assemblies. In particular, in the case of a wheel set of a rail vehicle, it is of particular interest for operational safety to detect damage and fractures.

As disclosed in EP 1 274 979 B1, the oscillation behavior of at least one vehicle component is monitored by capturing at least one oscillation signal, is subjected to a Fourier transformation and is compared with at least one reference value, wherein the frequency peak which is assigned to a natural oscillation component of the vehicle component is monitored with respect to at least one characteristic value (frequency characteristic value, damping characteristic value, amplitude characteristic value). Thus, the vehicle component is subjected to a modal analysis and modal parameters, e.g., natural frequency and damping being monitored to detect damage in the case of onboard diagnostics. However, the known method evaluates time profiles of the measurement signals in an undifferentiated fashion. In particular, in the method signals acquired under completely different peripheral conditions such as, for example, different static friction conditions or sliding friction conditions are evaluated jointly.

Accordingly, the characteristic values from the Fourier transformation, such as, for example, the values for the natural frequencies and their amplitude maximum values, are subject to relatively large radiation, which makes unambiguous and reliable evaluation of the frequency responses difficult. In particular, the excitation spectrum during operation is so different that at any individual time it is unclear which component on the measured signal the natural oscillations of the respective vehicle component have.

Although the known method provides that the frequency responses which have arisen from the measurements are compared with route-dependent reference frequency responses (new section of line, old section of line, extended section of line), this procedure entails some disadvantages. This is because, on the one hand, for all the sections of lines which can be traveled on during correct operation of the rail vehicle have to be taken into account. On the other hand, the properties of the route must then not be changed by external influences or the reference data have to be kept constantly up to date. However, this requires an inappropriately large amount of expenditure, for which reason the preconditions for application of the known method certainly cannot be complied with in practice.

The known method for monitoring the diagnostics and the state of rail vehicle components is consequently based on continual and continuous measurement and evaluation of measurement variables. However, in this context the peripheral conditions for the measurement variables change constantly. Analysis of the frequency responses acquired from the time signals is very costly because the influence of the peripheral conditions has to be evaluated using route-dependent reference signals.

SUMMARY

In view of the above, the disclosed embodiments provide a method of the generic type and a device of the generic type such that they permit damage and defects to a wheel set of a rail vehicle with less signal-processing expenditure and more reliably. Thus, the disclosed embodiments provide a method and a device, wherein the device is designed to carry out the following operations: identification of at least one significant event or a combination of a plurality of significant events within the time profile of the measurement signal, in which the measurement variable exceeds a predefined minimum value, as well as identification of the event time at which this significant event took place, formation of the frequency response from the time profile of the measurement signal from the event time onward, wherein the frequency response is formed for a defined time period starting from the event time, comparison of the formed frequency response with at least one stored reference frequency response, and evaluation of the oscillation behavior of the wheel set as a function of the deviation of the formed frequency response from the at least one stored reference frequency response.

This evaluation enables drawing conclusions about defects in the monitored wheel set based on the oscillation behavior which is changed or conspicuous under certain circumstances.

BRIEF DESCRIPTION OF THE FIGURES

The disclosed embodiments are presented in more detail below together with the description based on the figures, in which.

DETAILED DESCRIPTION

Figure 1:
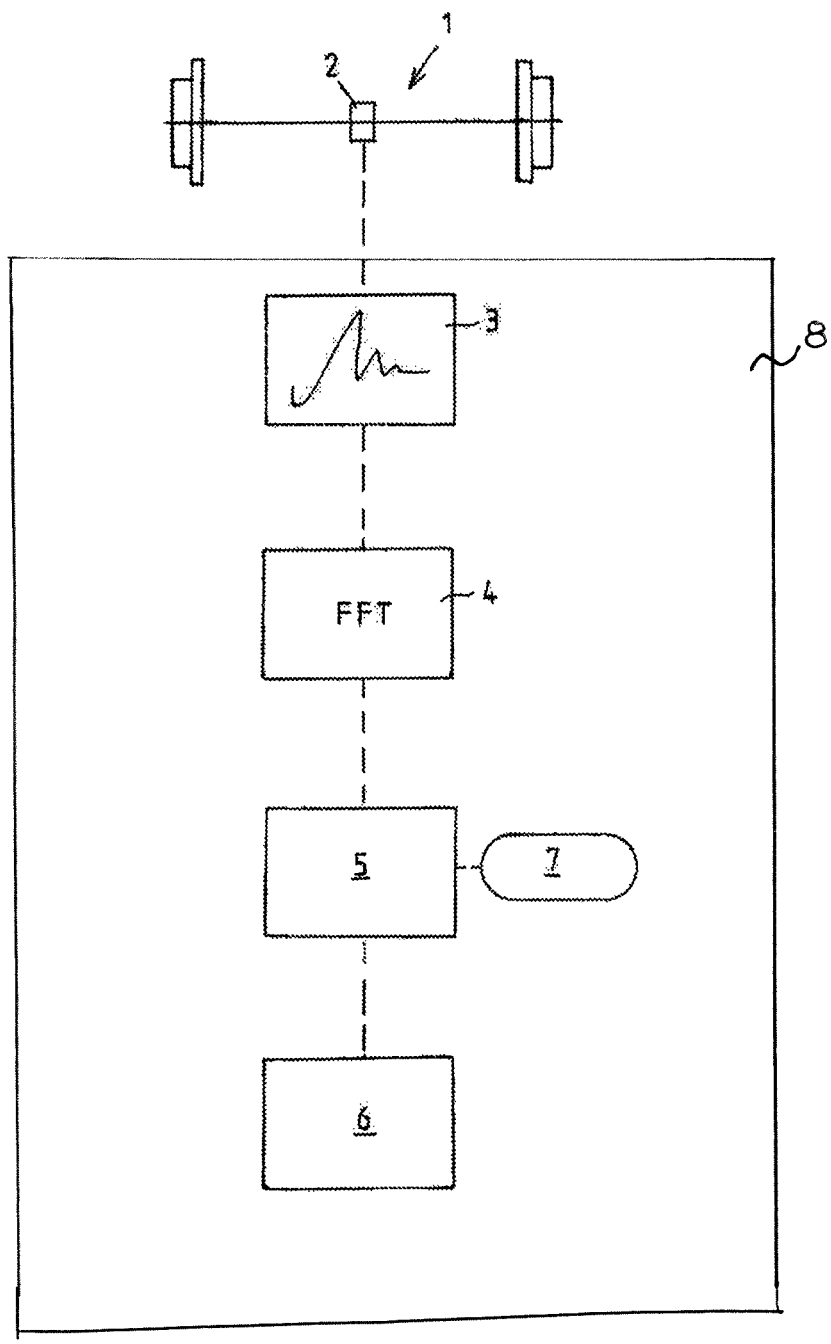
FIG. 1 shows a schematic block circuit diagram of a device for monitoring the driving behavior of a rail vehicle according to a disclosed embodiment.

The computational complexity is relatively small since the entire time profile of a measurement signal is not continuously subjected to Fourier transformation and analysis but rather only the response of the system to significant individual events is. Only the frequency responses, which have a high probability of supplying a reliable conclusion about the state of the monitored wheel set, and in particular indicate formation of a fracture on the wheel set, are formed or analyzed by defining significant individual events in advance.

Such significant events such as, for example, excitation of vertical oscillation of the wheel set with acceleration of the wheel set which is high, i.e., exceeds a predefined minimum value, result in the wheel set being excited overall to undergo detectable natural oscillations. Given a sufficiently high impact excitation in the vertical direction, for example as a result of coarse unevennesses of the rail, the wheel set lifts up virtually completely from the rail for a short time, with the result that the influence of the route being respectively traveled on the natural oscillation behavior can be estimated as being low. In particular, the wheel set can then oscillate virtually freely in its characteristic natural oscillation. As a result, the method operates independently of the route. In particular, it is possible to dispense with complex capturing and storage of route-dependent reference data.

Therefore, frequency responses and frequency analysis may be carried out only after significant individual events. Significant individual events may be defined as being events in which the time signals such as travel signals, speed signals, acceleration signals, force signals or pressure signals, which are recorded by at least one sensor, exceed or undershoot a respectively predefined threshold value or have a different characteristic feature at the event time.

In other words, in the case of a rail vehicle wheel set, which is to be monitored, a measurement signal of a variable characterizing the oscillation behavior of the wheel set is continuously measured using one or more sensors, but the corresponding frequency response is not formed and the frequency analysis not carried out until the measurement signal has exceeded a predetermined minimum value. The frequency analysis during a defined time period after the significant individual event as a chronological starting point and subsequent comparison with at least one reference frequency response permit a reliable conclusion to be drawn about changes and defects at the wheel set with only a small degree of computational complexity.

If, for example, the shaft of a wheel set has a fracture, the dynamic resilience of the wheel set increases, which results in a "relatively soft" system with a natural frequency which is relatively small compared to that of an undamaged shaft, and as a rule results in greater damping. Furthermore, the frequency peak at the natural frequency, i.e., the amplitude of the natural frequency in the frequency response becomes larger. These characteristic values of the natural oscillation form can be read from the formed frequency response in comparison with the reference frequency response.

Concentrating on defined individual events starting from a certain minimum amplitude of the signal representing the respective measured value ensures that the wheel set is always influenced by comparable peripheral conditions. The minimum value is selected here in such a way that a sufficient number of significant events can be expected. However, small excitations of the wheel set, which would in any case not excite any natural oscillations, are not taken into account, with the result that the computational complexity for the evaluation of the signals is drastically reduced compared to the prior art.

The acceleration of the wheel set in the vertical direction may be used as the measurement variable characterizing the oscillation behavior of the wheel set of the rail vehicle, wherein a significant event within the time profile of the acceleration is identified by virtue of the fact that the measured acceleration of the wheel set has exceeded a defined minimum value. It can then be assumed that the wheel set briefly virtually loses contact with the rail and as a result can oscillate virtually freely, as a result of which the natural frequency form is undisrupted, i.e., can form with adjacent structures without the contact influencing the rigidity and damping of the wheel set. For example, the predefined minimum value for the vertical acceleration is at least 10 g (10 $m/s^2$). With such a predefined minimum value for the vertical acceleration for defining the event time from which the frequency response is formed and analyzed or compared with at least one reference frequency response, it is possible, in particular, to reliably detect a fracture at the wheel set (wheel and/or shaft).

The frequency response may be generated from the time profile of the measurement signal by a Fast Fourier Transformation (FFT). As a result, reliable results can be obtained with an acceptable degree of computational complexity.

For example, the defined time period for which the frequency response of the time profile of the measurement signal is formed constitutes a continuously fixed time interval, for example between 5 and 500 milliseconds. This is because such a relatively short time window is satisfactory to carry out an informative Fourier transformation and to obtain an informative frequency response from which the modal parameters such as the natural frequency, amplitude of the natural frequency $\omega e$, Lehr's damping De and dynamic rigidity $S(\omega)$ and/or the dynamic resilience $N(\omega)$ are apparent or can be determined.

Alternatively, the defined time period for which the frequency response of the time profile of the measurement signal is formed starts from the event time and ends, however, when a specific characterizing property of the oscillation, such as a specific measure of the decay of the oscillation, occurs or a further or subsequent significant event occurs. In this case, the time period is therefore defined by the start and the end, but it is not always of the same length.

Furthermore, it is proposed that the reference frequency response is an expected frequency response which is generated computationally by model calculation or based on an exemplary specimen wheel set. Alternatively, the reference frequency response can be a frequency response of the monitored wheel set which is formed in advance from time profiles of the measurement variable or variables during the operation of the rail vehicle, or the reference frequency response constitutes averaging over a plurality of frequency responses of the monitored wheel set or of a plurality of other wheel sets. Last but not least, the frequency response can also be compared with a plurality of reference frequency responses of the monitored wheel set for statistical evaluation over time, the reference frequency responses being formed from time profiles of the measurement variable or variables during the operation of the rail vehicle.

The reference frequency response of the wheel set which is acquired in this way therefore constitutes a type of characteristic "wheel set fingerprint" which may be determined individually for each wheel set and is stored for analysis purposes for the comparison with reference data and the subsequent evaluation or assessment arising from the comparison. All these methods are suitable for obtaining data for the reference frequency response or responses computationally or based on statistical analyses.

The comparison of the formed frequency response with the at least one reference frequency response may take place based on at least one modal parameter such as natural frequency $\omega e$, amplitude of the natural frequency $\omega e$, Lehr's damping De or resilience N or rigidity S.

When the formed frequency response is compared with the at least one reference frequency response, the influence of the current state of wear of the wheel set and the current rotational speed of the wheel set may be taken into account. This allows the informativeness to be improved further with little signal-processing complexity.

During correct operation, the wheel sets of a rail vehicle roll over a railroad route. Depending on the speed and state of the railroad route, the wheel sets experience oscillation excitation. This oscillation excitation leads to oscillations in the wheel sets or their parts both absolutely in space and relative to adjacent structures or relative to one another. A wheel set is typically composed here of two wheels which are connected by an axle, as is shown by FIG. 1.

According to FIG. 1, one or more sensors 2 are mounted on a wheel set 1 of a rail vehicle (not illustrated further), which sensors 2 may capture accelerations of the wheel set 1 or a part thereof, for example, in the vertical direction and generate corresponding measurement signals, as acceleration sensors.

Capturing the measured values of the sensors 2 and passing them on to a signal capturing unit 3 permits a chronological acceleration profile of the vertical acceleration of the wheel set to be formed there. The signal capturing unit 3 also identifies what are referred to as "significant events" within the chronological acceleration profile as well as the assigned event times $t_0$.

A "significant event" within the time profile of the measurement signal is to be understood as being an event in which the measurement variable or the measurement signal exceeds a predefined minimum value. In the present case, the measurement signals are monitored, for example, to determine whether the measured vertical acceleration exceeds an acceleration minimum value $a_{min}$ or an acceleration minimum amplitude $a_{min}$. For example, the predefined acceleration minimum value $a_{min}$ for the vertical acceleration is at least +10 g or −10 g (m/s$^2$). In the present case, significant individual events are acceleration maximum values $MAX_1$ which can be positive or negative depending on whether the wheel set is actually accelerated or decelerated in the vertical direction, and exceed a minimum amplitude $a_{min}$ in the absolute value, as is shown by FIG. 2.

Figure 2:
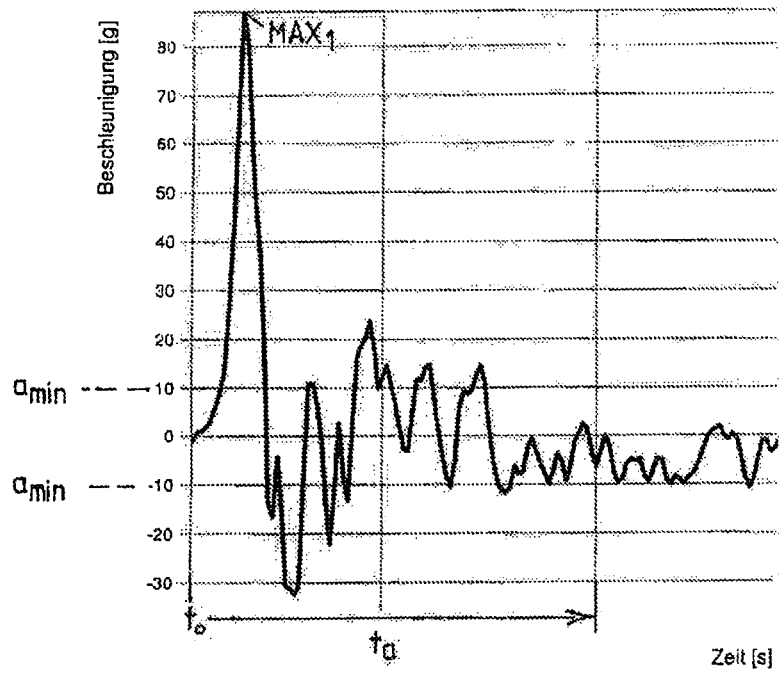
FIG. 2 shows an acceleration/time diagram of a monitored wheel set of the rail vehicle as a consequence of a significant event.

This is the case, for example, if the monitored wheel set travels over a joint or an unevenness in the rail route and as a result is excited, in particular, to undergo vertical oscillations which exceed a specific circumference, as are illustrated in FIG. 2. Given a sufficient size of the predefined minimum value $a_{min}$, it is possible to assume that the wheel set 1 is excited to undergo a harmonic natural oscillation which can be detected unambiguously and has a characteristic natural frequency ωe. Owing to the material damping and the damping brought about by the connection to adjoining structures, the oscillation amplitudes of the excited natural oscillation decay with time, as is shown by the profile of the acceleration time signal in FIG. 2 and/or the natural oscillation is excited again by a further significant event.

Alternatively, any other variable or else a combination of a plurality of other variables which is suitable for characterizing an oscillation of the wheel set in natural oscillation form in response to an extraneous excitation can be sensed as a time signal. Possible measurement variables in this context are not only the vertical acceleration but also, for example, accelerations in any desired direction, the fluctuation travel and/or the speed of the wheel set or of parts thereof. Last but not least, it is also conceivable for oscillations of the wheel set to generate dynamic forces or pressures which can then be measured by a force pickup or pressure pickup and represented as a chronological force or pressure signal. Their suitability for being able to represent natural oscillations of the monitored wheel set as well as possible is decisive for the selection of the measurement variable or else a combination of a plurality of measurement variables.

A frequency analysis unit 4 subsequently forms the frequency response from the time profile of the acceleration signal from the event time onward over a defined time period $t_a$. The defined time period ta may constitute a continuously fixed time interval starting from the event time $t_0$, for example between 5 and 500 milliseconds starting from the event time $t_0$, as is apparent, for example, from FIG. 2.

Alternatively, the defined time period ta for which the frequency response of the time profile of the measurement signal is formed starts from the event time $t_0$ and ends when a specific characteristic property of the oscillation such as a specific degree of decay of the oscillation occurs or a further event or a subsequent significant event occurs.

The frequency response is formed, for example, by virtue of the fact that the time signal is subjected to a Fourier transformation. The characteristic values of the natural oscillation excited by the significant event, i.e., the geometric natural oscillation form (given a plurality of sensors which are arranged distributed over the wheel set), the modal parameters of natural frequency ωe, amplitude of the natural frequency ωe, Lehr's damping De and rigidity Se or resilience Ne, which are associated with this natural oscillation form, can then be determined in a known fashion from the frequency response. It is not necessary to determine all the characteristic values of the natural oscillation here, individual values may be sufficient.

Furthermore, a comparison unit 5 is provided for comparing the frequency response formed from the time signal with at least one reference frequency response which is stored in a storage unit 7. In this context, the reference frequency response may be an expected frequency response which is generated computationally by model calculation or based on an exemplary specimen wheel set, for example based on an experimental modal analysis. Alternatively, the reference frequency response can also be a frequency response of the monitored wheel set which is formed in advance from time profiles of the measurement variable during the operation of the rail vehicle or the reference frequency response constitutes averaging of a plurality of frequency responses of the monitored wheel set or a plurality of other wheel sets. Last but not least, the frequency response which is formed from the time profile according to FIG. 2 can also be compared with a plurality of reference frequency responses of the monitored wheel set for statistical evaluation over time, the reference frequency responses being formed during a preceding operation of the rail vehicle.

Figure 3:
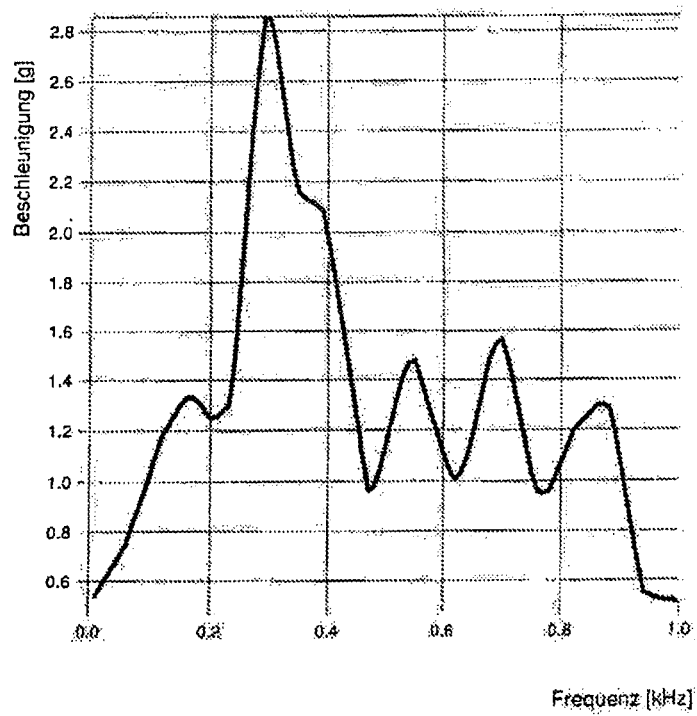
FIG. 3 shows an acceleration/frequency diagram of a reference frequency response.

FIG. 3 illustrates such a reference frequency response which, given a frequency of approximately 0.27 kHz, has a maximum value which constitutes one of the natural frequencies we of the wheel set. The comparison of the frequency response formed from the measured values acquired during operation with the reference frequency response may be carried out based on at least one modal parameter such as natural frequency ωe, amplitude of the natural frequency ωe, Lehr's damping De or resilience Ne or rigidity Se.

Given force excitation of the wheel set in the form of an impact which represents in an idealized form a single-mass oscillator with the mass m which is connected via a spring with the spring stiffness c and a damper with the damping D to the car body, a steady-state sinusoidal oscillation with the following natural frequency occurs after the transient response:

$$\omega_e = \sqrt{\frac{c}{m}} \quad (1)$$

and the Lehr's damping $$D_e = \frac{d}{2\sqrt{c \cdot m}} \quad (2)$$

and the dynamic resilience (with real part and virtual part)

$$N(\omega) = \frac{1/c}{1 + j \cdot 2 \cdot D \cdot \omega/\omega e - (\omega/\omega e)^2}. \quad (3)$$

If one of these modal parameters or a plurality of modal parameters deviates significantly, i.e., by a minimum value, from the corresponding value of the reference frequency response, this is an indication of a defect in the monitored wheel set, in particular of formation of a fracture in the shaft or in a wheel.

If, for example, the shaft of a wheel set has a fracture, the dynamic resilience N (ω) increases, which results in a "relatively soft" system with a natural frequency ωe which is smaller than that of an undamaged shaft, and results in relatively large Lehr's damping De. Furthermore, the frequency peak at the natural frequency ωe, i.e., the maximum amplitude of the natural frequency ωe in the frequency response, becomes larger.

The deviation of characteristic variables of the frequency response formed from the time signal with respect to the stored reference frequency response is evaluated by an evaluation unit 6. In this context, the influence of the current state of wear of the wheel set and the current rotational speed of the wheel set can also be taken into account.

The signal sensing unit 3, the frequency analysis unit 4, the comparison unit 5, the evaluation unit 6 and the storage unit 7 for the reference frequency response can be implemented, for example, as a combined signal capturing and evaluation device 8 in a single microcomputer.

to form a mean value of frequency responses formed from previously recorded time signals, the signal capturing and evaluation device 8 can also contain an averaging unit (not shown here explicitly) which averages a plurality of frequency responses of the monitored wheel set or of a plurality of other wheel sets and forms a reference frequency response therefrom.

LIST OF REFERENCE SYMBOLS

1 Wheel set
2 Sensor
3 Signal capturing unit
4 Frequency analysis unit
5 Comparison unit
6 Evaluation unit
7 Storage unit
8 Signal capturing and evaluation device 8
$MAX_1$ Acceleration maximum value
$t_a$ Time period
$a_{min}$ Minimum amplitude

The invention claimed is:

1. A method for monitoring the driving behavior of a rail vehicle, the method comprising:
   identifying at least one significant event within a time profile of a measurement signal generated by at least one sensor measuring at least one measurement variable characterizing vibration behavior of at least one wheel set of the rail vehicle, wherein during the at least one significant event, the measurement variable exceeds or undershoots a predefined threshold value;
   identifying an event time at which the identified at least one significant event took place;
   forming a frequency response from the time profile of the measurement signal from the identified event time onward, wherein the frequency response is formed for a defined time period ($t_a$) starting from the identified event time;
   comparing the formed frequency response with at least one stored reference frequency response; and
   evaluating oscillation behavior of the wheel set as a function of a deviation of the formed frequency response from the at least one stored reference frequency response.

2. The method of claim 1, wherein acceleration of the wheel set in a vertical direction is used as the measurement variable characterizing the vibration behavior of the wheel set of the rail vehicle, and wherein the significant event within the time profile of the acceleration is identified based on the measured acceleration of the wheel set exceeding a defined minimum value ($a_{min}$).

3. The method of claim 2, wherein an absolute value of the defined minimum value ($a_{min}$) for the vertical acceleration is at least 10 g.

4. The method of claim 1, wherein the frequency response is generated from the time profile of the measurement signal using a Fast Fourier Transformation (FFT).

5. The method of claim 1, wherein the defined time period ($t_a$) for which the frequency response of the time profile of the measurement signal is formed constitutes a continuously fixed time interval.

6. The method of claim 1, wherein the defined time period ($t_a$) for which the frequency response of the time profile of the measurement signal is formed starts from the event time and ends when a specific characterizing property of the vibration occurs.

7. The method of claim 1, wherein the reference frequency response is an expected frequency response which is generated computationally by model calculation or based on an exemplary specimen wheel set.

8. The method of claim 1, wherein the reference frequency response constitutes at least one frequency response of the monitored wheel set which is formed from time profiles of the measurement variable during operation of the rail vehicle or averaging over a plurality of frequency responses of the monitored wheel set or of a plurality of other wheel sets.

9. The method of claim 8, wherein the frequency response is compared with a plurality of reference frequency responses of the monitored wheel set for statistical evaluation over time, the reference frequency response being formed from time profiles of the measurement variable during the operation of the rail vehicle.

10. The method of claim 1, wherein the comparison of the formed frequency response with the at least one reference frequency response is performed based on at least one modal parameter.

11. The method of claim 10, wherein the at least one modal parameter is one of a natural frequency, Lehr's damping or resilience.

12. The method of claim 1, wherein, when the frequency response is compared with the at least one reference frequency response, an influence of a current state of wear of the wheel set and a current rotational speed of the wheel set are taken into account.

13. The method of claim 1, wherein the at least one measurement variable characterizing the vibration behavior of at least one wheel set of the rail vehicle is one of fluctuation, speed or acceleration of the wheel set or force acting on the wheel set.

14. A device for monitoring the driving behavior of a rail vehicle, the device comprising:
at least one sensor supplying a measurement signal corresponding to at least one measurement variable characterizing vibration behavior of at least one wheel set of the rail vehicle;
a signal capturing and evaluation device that identifies at least one significant event within a time profile of the measurement signal, wherein during the at least one significant event, the measurement variable exceeds a predefined minimum value and identified an event time at which the at least one significant event took place, forms a frequency response from the time profile of the measurement signal from the identified event time onward, wherein the frequency response is formed for a defined time period ($t_a$) starting from the identified event time, compares the formed frequency response with at least one stored reference frequency response, and evaluates the oscillation behavior of the wheel set as a function of a deviation of the formed frequency response from the at least one stored reference frequency response.

15. The device of claim 14, wherein the signal capturing and evaluation device includes at least a signal capturing unit which identifies significant events within the time profile of the measurement signal and the associated event times, a frequency analysis unit which forms the frequency response from the time profile of the measurement signal from the event time onward over the defined time period ($t_a$), a comparison unit for comparing the formed frequency response with the at least one stored reference frequency response, an evaluation unit for evaluating the oscillation behavior of the wheel set as a function of the deviation of the formed frequency response from the at least one stored reference frequency response.

16. The device of claim 15, wherein the signal capturing and evaluation device also contains an averaging unit which averages a plurality of frequency responses of the monitored wheel set or of a plurality of other wheel sets and forms the reference frequency response therefrom.

17. The device of claim 14, wherein the at least one sensor senses acceleration of the wheel set in the vertical direction.

18. The device of claim 14, wherein the at least one measurement variable characterizing the vibration behavior of at least one wheel set of the rail vehicle is one of fluctuation, speed or acceleration of the wheel set or force acting on the wheel set.

* * * * *